United States Patent [19]

Julien et al.

[11] Patent Number: 4,925,637
[45] Date of Patent: May 15, 1990

[54] LIQUID FEED SUPPLEMENT FOR MONOGASTRIC ANIMALS

[76] Inventors: William E. Julien, 3459 Lindenwood, Sioux City, Iowa 51104; Stephen P. Krajicek, 4635 Calvert, No. 3, Lincoln, Nebr. 68506

[21] Appl. No.: 53,315

[22] Filed: May 22, 1987

[51] Int. Cl.⁵ ............................................... A23K 1/00
[52] U.S. Cl. ........................................ 426/2; 426/309; 426/613; 426/630; 426/807
[58] Field of Search ............... 426/807, 613, 648, 658, 426/2, 623, 630, 601, 309

[56] References Cited

U.S. PATENT DOCUMENTS

| | | | |
|---|---|---|---|
| 1,285,555 | 11/1918 | Bradley | 426/613 |
| 2,793,952 | 5/1957 | Rawlings | 426/658 |
| 2,851,357 | 9/1958 | Bedford | 426/655 |
| 3,410,690 | 11/1968 | Lindburg | 426/648 |
| 3,433,649 | 3/1969 | Cooke et al. | 426/613 |
| 3,895,117 | 7/1975 | Backlund | 426/648 |
| 3,901,976 | 8/1975 | Roth et al. | 426/658 |
| 3,997,682 | 12/1976 | Allen | 426/613 |
| 4,049,831 | 9/1977 | Ono et al. | 426/613 |
| 4,055,667 | 10/1977 | Linton et al. | 426/658 |
| 4,247,561 | 1/1981 | Nelson | 426/635 |
| 4,375,483 | 3/1983 | Shuford et al. | 426/613 |
| 4,384,008 | 5/1983 | Millisor | 426/613 |

OTHER PUBLICATIONS

Hawley "The Condensed Chemical Dictionary" Tenth Edition Van Nostrand Reinhold Co New York City(1982) pp. 282 & 772, 418,618,758.
Arctander "Perfume & Flavor Chemicals" vol. II Publishes by the Author 1969 Monteclair NJ (1975) pp. 2654.
Hawley The Condensed Chemical Dictionary 10th Edition Van Nostrand Reinhold Co. (1982) pp. 6, 253-254 & 862.
Jimenez Nutritionists updated on new generation of liquid supplements Feedstuffs vol. 58 No. 8 pp. 12 & 29 (1986).
"MorFatt" Advertising Label S&L Distributors Inc., Omaha NE.
"Liquid Chosen Fat" Advertising Label Farm Center Coon Rapids, Ia.
"Soweena D.C.O.-220" Advertising Label Merricks Inc., Middletown, WI.

Primary Examiner—R. B. Penland
Attorney, Agent, or Firm—Zarley, McKee, Thomte, Voorhees & Sease

[57] ABSTRACT

A liquid feed supplement includes a blend of aromatic flavoring agents in a fat-miscible liquid base and liquid fats. In the preferred form of the invention, the liquid fats are a blend of one source of fatty acids having a carbon chain length between 2 and 21 carbon atoms and a second source of fatty acids having a carbon chain length between 14 and 21 carbon atoms. The best results have been obtained with a propionic acid base solution for the flavoring agents; coconut oil for the first fat source; and a blend of corn and soy oils for the second fat source. The supplement not only increases the production performance, but also overcomes caloric satiety so as to increase total feed intake in monogastrics.

7 Claims, No Drawings

LIQUID FEED SUPPLEMENT FOR MONOGASTRIC ANIMALS

TECHNICAL FIELD

This invention relates generally to fat products which supplement feeds for monogastric animals, and more particularly, to an improved liquid feed supplement which will overcome the animal's caloric satiety.

BACKGROUND OF THE INVENTION

The science of the nutrition of farm animals has reached a highly advanced state as efforts continue to attempt to reach the full genetic potential for production and growth within domestic species. Research effort in terms of nutrition is generally divided between the special problems associated with ruminant animals and those encountered in monogastric animals. A wide variety of products have been utilized as a feed supplements in an attempt to increase production performance in monogastric animals. Various studies in the prior art have shown that the addition of fats and oils to the feed of monogastric animals may positively affect their performance, although the results have been variable.

In a series of trials conducted at the Animal Science Department, Virginia Agricultural Experiment Station, Virginia Polytechnique Institute and State University, it was found that the addition of soyabean oil to a pig's diet tended to reduce daily food intake and improve feed efficiency.

Similarly, at Texas Technical University, lysine was added at 0.05 and 0.01% to diets based on sorghum and soyabean oilmeal with 4 and 8% fat added to maintain a digestible energy : lysine ratio similar to the basal diet. In pigs weighing 28.5 to 59 kg, there was no difference among groups in rate of gain, feed intake or feed for unit gain. From 59 to 101 kg and overall, pigs given added fat ate less and required less feed for unit gain than those given the basal diet. Pigs given 8% added fat ate less and required less feed for unit gain than those given 4%.

N. J. Lawrence, et al., in an article in the Journal of Animal Science (1983), described tests with various fat products utilized as feed supplements. At Oklahoma State University, the effect of a dietary fat source was studied in these tests. Pigs were fed on diets containing butter fat, maize oil, coconut oil or lard on a DM basis. It was found that gain and efficiency of feed use were greater for pigs fed on coconut oil than for pigs fed on maize or lard. In a second trial, choice white grease was added to a starter diet at 0, 4, 8 and 12%. Levels of maize and soyabean oilmeal were altered to maintain a constant ratio of other nutrients to digestible energy. It was found that feed intake decreased as fat level increased. Gains the first two weeks also decreased linearly with fat level. Efficiency of feed use was not significantly affected by dietary fat level, but efficiency of use of calculated digestible energy decreased with added fat.

Thus, as can be seen, fat products are known in the prior art to cause a decrease in feed intake while causing a corresponding increase in efficiency. The decrease in feed intake associated with the use of dietary fat in the animals's feed occurs because animals eat to caloric satiety. Caloric satiety is defined as that level of energy intake that produces a cessation of appetite. Fats and oils contain more than twice the level of energy provided in other nutrients per unit of weight. The substitution, or addition, of fat to other feed stuffs increases the caloric value of the blended feed per unit of weight. This reduces the amount of ingested feed necessary to reach caloric satiety. Efficiency in diets supplemented with fats is increased because performance, as determined by parameters deemed appropriate to the class of the livestock being fed, is not reduced in proportion to the normal decrease in feed intake.

One of the problems with the utilization of fat products as feed supplements is the difficulty encountered in handling the supplement. Fat supplements currently available to the feed industry may be classified as one of four general types: (1) Fats of animal origin — these are solid at temperatures less than 102–104° F.; (2) Fats of vegetable origin — these are liquid at all normal working temperatures; (3) Blends of animal and vegetable fats — the handling characteristics of this type are reflected by the percentage of animal fat used; and (4) Dry fats — usually of animal origin. Because of the use of fats of animal origin in types 1 and 3, it is necessary to heat the supplements in order to blend the supplement with dry feeds. No heating is necessary for types 2 and 4. However, dry fats (type 4) will to liquify at temperatures about 90° F. Thus, these temperatures will cause the dry fats blended with the dry feeds to clump and make the finished feed product difficult to handle. Thus, all of the above-mentioned types of feed supplements, except fats of vegetable origin, will require the consumer to utilize specialized equipment in order to use them at the site of the feed lot.

Flavorings have also been the subject of prior art studies, to determine if the same will increase the feed intake or otherwise positively impact animal performance. In a study conducted at Virginia Polytechnique Institute and State University, and described in an article by E. T. Kornegay, et al., entitled "Evaluation of Rearing Systems and Feed Flavors for Pigs Weaned at Two to Three Weeks of Age", in the Journal of Animal Science, Volume 48, No. 5 (1979), seven trials were conducted in which several feed flavors were evaluated. The overall conclusion from these studies were that the addition of feed flavors to the basal diet did not improve daily food intake, conversion or daily gain for pigs weaned at the various ages.

Such studies have been conducted based on the suggestion that various dietary sweeteners, aromatic compounds and certain natural ingredient additives will attract pigs to their diet and increase intake, thereby improving performance. The studies (cited in the Kornegay et al. article) suggest that, when offered a choice, young pigs generally exhibit a preference for starter diets containing sugar, saccarin or whey. However, when no choice is offered, there is little or no difference in diet consumption or performance.

The results of the Kornegay et al. studies confirmed the results of previous studies: that average daily gain, feed intake and feed per unit gain for the first week and the overall period were not significantly different in any trial for pigs fed the basal diet compared to diets containing the various feed flavors. Thus, where a preference choice is not available, there is no difference in diet consumption or performance between pigs fed sweetened or flavored and nonsweetened or nonflavored diets.

While flavorings are known and utilized in the prior art, their application to feed has been ineffective. Flavorings are typically produced in either dry powder form or water-soluble form. Because of the low inclusion rate used when blending dry flavors into dry feeds, it is nearly impossible to arrive at a uniform distribution of flavor in the finished product. Dry flavors are often volatile and lose potency when exposed to the heat commonly associated with the manufacture of feeds and/or their storage during summer months. Water soluble flavoring were only minimally more effective, since dry feeds absorb water primarily at the point of application, thereby making uniform distribution difficult to achieve. While a uniform mixture of water soluble flavors was possible by utilizing special equipment having low volume, high pressure density characteristics, such equipment would be economically unfeasible for the individual consumer.

It is therefore an object of the present invention to provide an improved feed supplement for monogastric animals.

Another object of the present invention is to provide a feed supplement which may be uniformly mixed with feed by the consumer at the feedlot.

Yet another object is to provide a feed supplement in liquid form to simplify handling.

A further object of the present invention is to provide a liquid feed supplement in a form which is easily and uniformly mixed with a dry feed, thereby avoiding the sporadic concentrations found in the prior art when dry and water-soluble flavorings were added to dry feeds.

Another object is to provide a feed supplement which will reduce airborne dust during and after mixing.

Still a further object of the present invention is to provide a fat product nutritionally superior to prior art products and easier to handle by the individual consumer.

Yet a further object is to provide a feed supplement which will inhibit mold growth.

Still another object of the present invention is to provide a liquid feed supplement which will overcome caloric satiety in the animal.

Yet another object of the present invention is to provide a liquid feed supplement which will increase production performance in monogastric animals.

These and other objects of the present invention will be apparent to those skilled in the art.

SUMMARY OF THE INVENTION

The improved liquid feed supplement of this invention is a liquid fat product which is mixed by the user at the feedlot with his choice of conventional dry feed. The product includes a blend of aromatic flavoring agents in a fat-miscible liquid carrier solution, combined with liquid fats. In the preferred form of the invention, the liquid fats are a combination of fats of saturated and polyunsaturated chemical structure. The best results have been obtained with a propionic acid carrier solution for the aromatic flavoring agents; coconut oil as the source of saturated fat; and a blend of corn and soy oils as the source of polyunsaturated fat.

DESCRIPTION OF THE PREFERRED EMBODIMENT

As discussed in the background of the invention, the addition of fats to conventional dry animal feed will increase production performance by decreasing the amount the animal eats while maintaining caloric intake. The addition of flavoring agents to animal feed has not been found to either increase or decrease the animal's feed intake.

However, the inventors herein have discovered that a combination of conventional aromatic flavoring agents and conventional liquid fats or oils produces a feed supplement which has dramatically increased overall production performance in monogastric animals. In growing/finishing swine, the invention has caused increased growth while also improving feed efficiency; in lactating sows, the invention has significantly increased feed consumption and reduced postparturient weight loss; it has increased litter weaning weights; it has reduced litter mortality; and it has reduced the days to first estrus.

The tremendous increase in performance produced by the invention has basis in a number of factors:

First, the novel combination of fats and flavors of the invention overrides the metabolic control of the animal's appetite, thereby significantly increasing nutrient intake as compared to the attempts in the prior art to all fat products alone.

Second, the novel combination of ingredients of the invention increases feed palatibility by reducing airborne dust and insuring a uniform dispersion of aromatic feed flavors as compared to prior art attempts at adding only a dry or water soluble flavor. The combination of the above two features has produced dramatic effects in terms of animal performance, as determined by parameters recognized within the art for the class of livestock fed. These results have been confirmed in various studies conducted by the inventors.

Third, by blending a source of saturated and polyunsaturated fats, the invention achieves a fatty acid balance which is physiologically superior to either a saturated or polyunsaturated fat used alone. Further, by blending a saturated fat with a polyunsaturated fat, the mixture acquires the physical characteristics of the polyunsaturate, i.e., a liquid at temperatures common under normal use. A saturated fat alone would not have such characteristics.

One important feature of the invention is in providing a stable fat product in liquid form which may be easily mixed by the consumer at the feedlot. The oil-based (liquid fat based) product of this invention eliminates the shortcomings found in prior art dry and water-soluble flavorings. It can be seen that an oil-based product will not be absorbed by the dry feed so as to be concentrated, as a water-soluble product can; nor will the oil-based supplement settle to the bottom of the feed during movement, as dry products can. Rather, a proper oil-based product is easily and uniformly mixed throughout the dry feed, coating the feed with the aromatic flavoring and fat supplement.

Important characteristics of the invention include an aromatic flavoring agent in a fat-soluble carrier solution combined with a liquid fat. The ability to maintain the fat product in a liquid solution is important to the invention, and thus the liquid fat product is preferably a vegetable fat rather than an animal fat. While animal fats may be utilized in the supplement, the percentage of the total product must be low enough to maintain the product in liquid form at temperatures down to 32°-35° F. It is estimated that the percentage should be below about 10% of the total to maintain this characteristic in the desired range of temperatures.

The ability to maintain the fat product in a liquid solution occurs from the blending of three sources of fats. One source of fats is a saturated fat. Or, more broadly stated, one source of fat is any fat structurally comprised of fatty acids having carbon chain lengths between 2 and 21 carbon atoms. The second and third sources of fats are a blend of polyunsaturated fats. Or, more generally, a blend of two or more fats comprised of fatty acids each having carbon chain lengths between 14 and 21 carbon atoms.

The preferred ingredients resulting in the highest efficiency are in the use of coconut oil as the first fat source, and a blend of corn and soy oils as the second and third fat sources. The preferred proportions are as follows: (1) Coconut oil, 25%; (2) soy oil, 45%; and (3) corn oil, 30%.

Again, the critical aspect of this invention does not rely solely in the use of fat products, since it is known in the prior art that fat products will increase production performance. Rather, it is the combination of fat products with aromatic flavoring agents in a fat-miscible carrier solution to form a liquid end product which has produced totally unexpected and dramatic results. Rather than decreasing feed intake, as was found in the prior art studies of fat products, this combination actually increased feed intake by overcoming the animal's caloric satiety and also increased production performance per unit of feed intake. Such a dramatic increase in feed intake and efficiency was heretofore unknown.

While flavorings are known in the prior art in dry and water-soluble forms, such flavorings have markedly decreased potency in these forms. As the studies at the various universities have shown, feed flavorings in themselves have had little effect on the eating habits or production performance of animals The inventors have provided a liquid solution of flavoring agents embodied in a fat-soluble carrier solution such as propionic acid, citric acid or acetic acid. All of these acids have been found acceptable and are soluble with the fat products to form a liquid end product. Furthermore, the fat soluble acid base is of such a quantity as to lower the pH of the total end product. The lowering of the pH level will inhibit the growth of mold in the feed with feed supplement. While mold inhibitors are also known in the prior art, they are not easily uniformly mixed to achieve the best and most efficient results in use in supplements or feed products. The use of the fat-soluble acid carrier solution for the flavoring with the dual effect of inhibiting mold growth and increasing production performance, is heretofore unknown in the art.

The discovery of a feed supplement which overcomes caloric satiety in the animal is also undisclosed in the prior art. In fact, the studies indicate a decreased feed intake in the use of prior art feed supplements.

The use of a liquid feed supplement with an oil-base has yet another advantage over known products — the reduction of airborne dust. Not only does the oil-base allow for uniform dispersion of the feed supplement in the feed, but the oil will not evaporate, thereby eliminating dust from the feed. Because airborne dust can cause respiratory disease, the inventors have reduced such risks by eliminating this dust.

It can be seen that the blends of fats and aromatic flavors of the present invention produces a physiological effect directly opposed to that which would be expected. It can therefore be seen that the improved liquid feed supplement of this invention fulfills at least all of the above-stated objectives.

I claim:

1. A liquid feed supplement, consisting essentially of aromatic flavoring agents in a fat-soluble acid carrier solution uniformly blended with vegetable oils and fats from a blend of first and second fat sources which are in liquid form at ambient temperature; wherein said first fat source is selected from the group of fats structurally made up of fatty acids with a carbon chain length between 4 and 24 carbon atoms and said second fat source is selected from the group of fats structurally made up of fatty acids with a carbon chain length between 14 and 24 carbon atoms;

said blend overcoming caloric satiety in monogastric animals when coated on dry animal feed and fed to the animals.

2. The liquid feed supplement of claim 1, wherein fats from first fat source comprises approximately 25% of the total fats.

3. The feed supplement of claim 1, wherein said second fat source is comprised of a blend of at least two different fats, each of said two fats being selected from the group of fatty acids having a carbon chain length between 14 and 24 carbon atoms.

4. The liquid feed supplement of claim 3 wherein one of said fats of said second fat source is corn oil.

5. The liquid feed supplement of claim 3 wherein one of said fats of said second fat source is soy oil.

6. The liquid feed supplement of claim 1, wherein said fat-soluble carrier solution is propionic acid.

7. A method for overcoming caloric satiety in monogastric animals, to increase their feed intake, comprising the steps of: providing a dry animal feed grain;

providing a blend of aromatic flavoring agents and vegetable fats, said vegetable fats being from a blend of first and second fat sources which are in liquid form at ambient temperatures; wherein said first fat source is selected from the group of fats structurally made up of fatty acids with a carbon chain length between 4 and 24 carbon atoms and said second fat source is selected from the group of fats structurally made up of fatty acids with a carbon chain length between 14 and 24 carbon atoms; said flavoring agents being distributed in a fat-soluble acid carrier solution;

uniformly coating said dry grain with said blend so that said coated grain overcomes caloric satiety in said monogatric animals; and feeding said coated grain to said monogastric animals.

* * * * *